United States Patent [19]

Siefert

[11] Patent Number: 5,778,380
[45] Date of Patent: *Jul. 7, 1998

[54] INTELLIGENT RESOURCE TRANSFORMATION ENGINE FOR TRANSLATING FILES

[75] Inventor: David M. Siefert, Englewood, Ohio

[73] Assignee: NCR Corporation, Dayton, Ohio

[*] Notice: The term of this patent shall not extend beyond the expiration date of Pat. No. 5,564,043.

[21] Appl. No.: 835,280

[22] Filed: Apr. 9, 1997

Related U.S. Application Data

[63] Continuation of Ser. No. 401,736, Mar. 9, 1995, abandoned, which is a continuation-in-part of Ser. No. 217,065, Mar. 24, 1994, abandoned.

[51] Int. Cl.$^6$ .................................................. G06F 17/30
[52] U.S. Cl. .......................... 707/103; 707/10; 395/710
[58] Field of Search .............................. 395/610, 712, 395/710, 800.29, 500; 707/103, 10

[56] References Cited

U.S. PATENT DOCUMENTS

| 5,179,703 | 1/1993 | Evans | 395/703 |
| 5,251,314 | 10/1993 | Williams | 395/612 |
| 5,287,537 | 2/1994 | Newmark et al. | 395/800.29 |
| 5,303,379 | 4/1994 | Khoyi et al. | 395/710 |
| 5,317,722 | 5/1994 | Evans | 395/500 |
| 5,434,776 | 7/1995 | Jain | 704/8 |
| 5,564,043 | 10/1996 | Siefert | 707/103 |
| 5,568,383 | 10/1996 | Johnson et al. | 704/2 |

FOREIGN PATENT DOCUMENTS

| 388050 | 9/1990 | European Pat. Off. |
| 398640 | 11/1990 | European Pat. Off. |
| 9320511 | 10/1993 | WIPO |

Primary Examiner—Thomas G. Black
Assistant Examiner—Greta L. Robinson
Attorney, Agent, or Firm—Gregory A. Welte

[57] ABSTRACT

The invention allows computer programs to load files generated by other programs. The invention identifies the program which generated a file of interest, based on overhead data contained within the file, and translates the file into a format compatible with the user's program. The invention can also identify the language in which a text file was written, and translate the language into another language specified by the user. Each user has a profile, which specifies preferences of the user, such as preferred language, preferred output device, preferred screen colors, and so on. The invention causes files to be displayed in conformity with the user's profile.

12 Claims, 5 Drawing Sheets

5,778,380

INTELLIGENT RESOURCE TRANSFORMATION ENGINE FOR TRANSLATING FILES

This is a Continuation of application Ser. No. 08/401, 736, filed Mar. 9, 1995 and now abandoned entitled INTELLIGENT RESOURCE TRANSFORMATION ENGINE FOR TRANSLATING FILES which is a Continuation in part Ser. No. 08/217,065 filed Mar. 24, 1994 and now abandoned entitled AUTOMATED RESOURCES MANAGEMENT SYSTEM.

RELATED APPLICATIONS

Ser. No. 08/217,062, entitled "Ordering and Downloading Resources from Computerized Repositories," in which David M. Siefert is the Inventor, filed on Mar.24, 1994 now abandoned.

Ser. No. 08/217,063, entitled "Automated Updating of Computer Software," in which David M. Siefert is the Inventor, filed on Mar. 24, 1994.

Ser. No. 08/217,066, entitled "Future Boolean Searching of Multiple Repositories of Resources," in which David M. Siefert is the Inventor, filed on Mar. 24, 1994 now abandoned.

Ser. No. 08/217,067, entitled "Security Aspects of Computer Resource Repositories," in which David M. Siefert is the Inventor, filed on Mar. 24, 1994 now abandoned.

Ser. No. 08/217,422, entitled "Launching Computer Program Upon Download of Data Created by Program," in which David M. Siefert is the Inventor, filed on Mar. 24, 1994 now U.S. Pat. No. 5,564,043.

Ser. No. 08/217,476, entitled "Computer System for Management of Resources," in which David M. Siefert is the Inventor, filed on Mar. 24, 1994.

Ser. No. 08/218,024, entitled "Multiple Repositories of Computer Resources, Transparent to User," in which David M. Siefert is the Inventor, filed on Mar. 24, 1994 now U.S. Pat. No. 5,721,906.

Ser. No. 08/334,775, entitled "Computer-Assisted Education," in which David M. Siefert is the Inventor, filed Nov. 4, 1994.

Ser. No. 08/334,776, entitled "Computerized Repositories Applied to Education," in which David M. Siefert is the Inventor, filed Nov. 4, 1994.

Ser. No. 08/334,777, entitled "Computer-Assisted Education Using Video Conferencing," in which David M. Siefert is the Inventor, filed Nov. 4, 1994.

Ser. No. 08/334,778, entitled "Automated Lesson Selection and Examination in Computer-Assisted Education," in which David M. Siefert is the Inventor, filed Nov. 4, 1994.

Ser. No. 08/334,779, entitled "Selecting Teaching Strategies Suitable to Student in Computer-Assisted Education," in which David M. Siefert is the Inventor, filed Nov. 4, 1994.

Ser. No. 08/334,780, entitled "Computer-Assisted Curriculum," in which David M. Siefert is the Inventor, filed Nov. 4, 1994.

These Applications are hereby incorporated by reference.

The invention concerns translation of resources from one computer system to another.

BACKGROUND OF THE INVENTION

The patent applications identified above describe a system in which resources (such as data, computer programs, information, and other computer-downloadable objects) are stored in multiple computers, at multiple locations. Despite the distributed storage of the resources, the system makes them available to a user, as though stored at the user's own location.

In the general case, the resources will have been created by different computer programs, running on different computer systems. For example, one resource may be a document created by a word-processing program running on a system designed according to the personal computer architecture defined by IBM corporation, located in Armonk, N.Y.

Another resource may be a second document created by a different word-processing program, running on a system designed by Apple Computer Corporation, located in Cupertino, Calif.

Yet another resource may be a third document created by another word-processing program, running on a Sun Workstation, produced by Sun Microsystems, located in Sunnyvale, Calif.

In general, these resources cannot be freely interchanged among the various word-processing programs: each word-processing program cannot directly use the documents created by the others. For a large system, containing millions of resources, generated by many different programs and systems, such a lack of compatibility is a significant problem.

OBJECTS OF THE INVENTION

An object of the invention is to provide compatibility of computer resources between different systems.

A further object of the invention is to provide compatibility between (a) different computer resources and (b) needs specified by a user.

SUMMARY OF THE INVENTION

In one form of the invention, a user retrieves a computer resource. The invention inquires whether the resource is compatible with the user's system, and with the program being used by the user. If so, the resource is retrieved in the usual manner.

If not, the invention transforms the resource into a form compatible with the user's program and the system. (In one embodiment, if the resource is incompatible with the user's program, the invention attempts to locate the proper program, launch it, and load the resource into it.)

In addition, in other forms of the invention, a profile is maintained which specifies certain preferences of the user. Two such preferences are (1) a preferred natural language (such as English or French), (2) the type of interface which the user prefers. The invention presents the resource in a manner compatible with the profile.

Also, another profile, termed a "learning profile," is maintained, which, in a simplified sense, specifies the current status of a user, with respect to a curriculum which the user is undertaking. The invention ensures compatibility between the resource and the learning profile, if possible.

BRIEF DESCRIPTION OF THE DRAWINGS

Figs. 4A and 4B, illustrates fragmentation of files.

DETAILED DESCRIPTION OF THE INVENTION

This discussion will first elaborate upon some differences found in computer files. These differences can cause problems in compatibility between different computer systems and programs.

File Format

Different computer systems and programs store data differently. For example, assume that the data to store is the phrase "The unicorn was born in a lilac wood" A common method of storage is to assign a unique bit sequence to each character, using one of several available coding schemes, and to store the assigned bits.

For example, the first word in the phrase contains three characters: "T", "h", and "e". Under the American Standard Code for Information Interchange (ASCII) Standard No. X3.4-1968, "T" is assigned the seven-bit sequence 101 0100, "h" is assigned 110 1000, and so on. (Other coding schemes, such as EBCDIC, are available, in which different assignments are used.) The overall collection of bits is then stored, and is called a "file".

Figure 1:
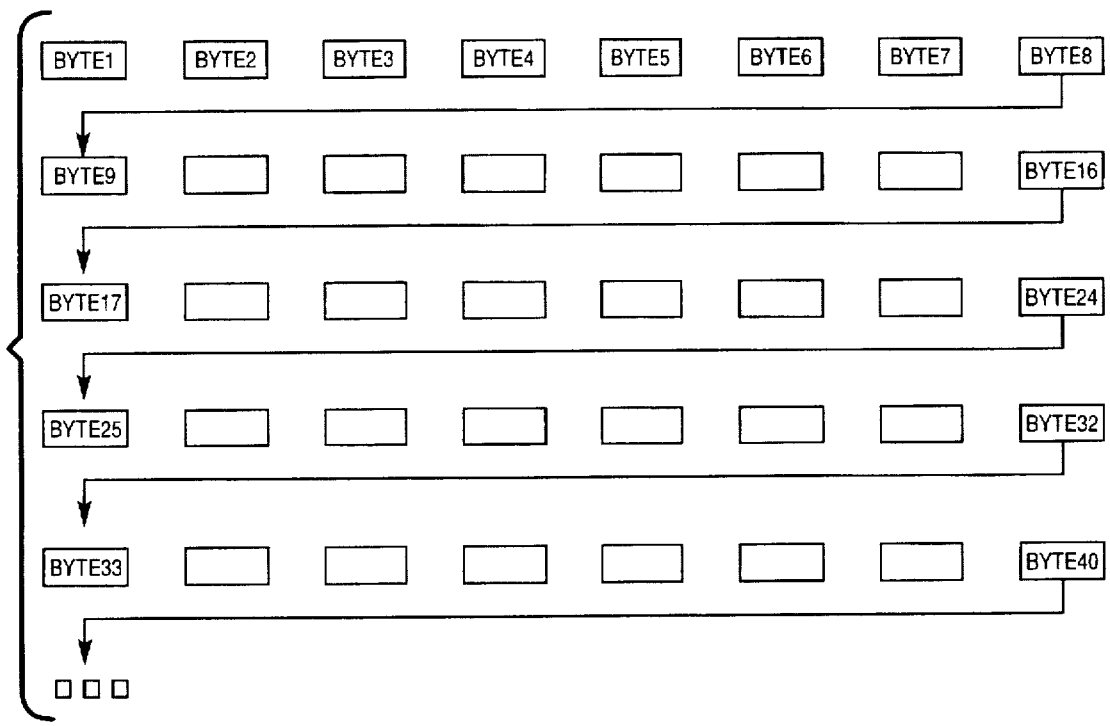
FIG. 1 illustrates a generalized file, or sequence of bytes, in order to establish background for subsequent Figures.

The file can be viewed as a sequence of bytes. (The ASCII scheme discussed above uses only seven bits of a byte for each character.) FIG. 1 illustrates a generalized file, or sequence of bytes, wherein each box represents one byte.

However, the arrangement is not so simple as it may first appear.

The file is required to contain other data, in addition to the data to be stored. This additional data can be called "overhead data," while the 10 data to be stored (which is the phrase "The unicorn . . . " in this example) can be called "user data".

Figure 2:
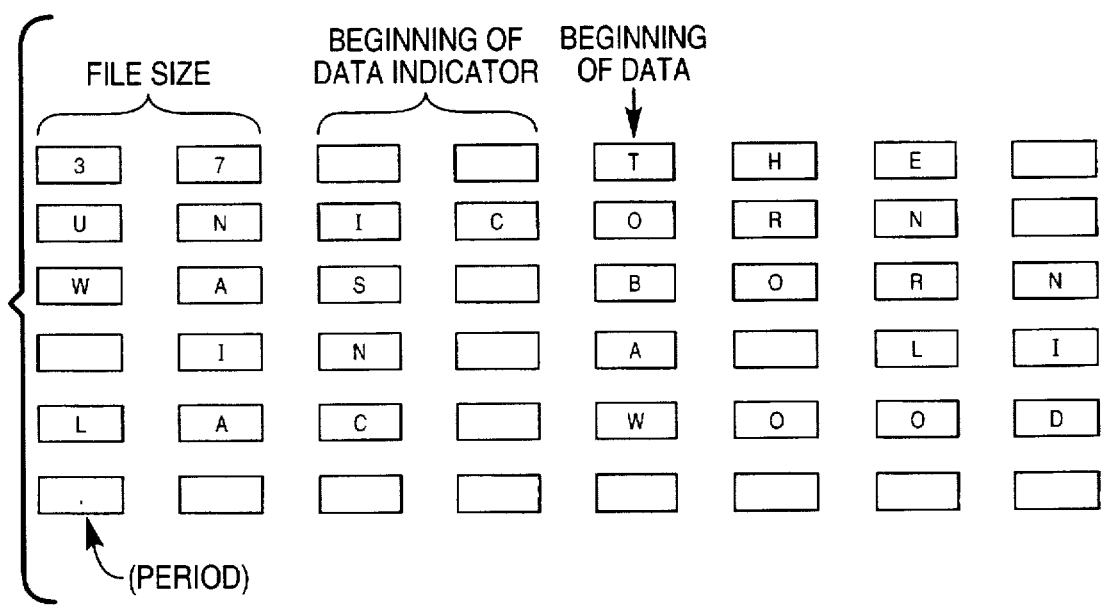
FIG. 2 illustrates an extremely simple file structure.

FIG. 2 illustrates a very simple example of overhead data. The overhead data tells the FILE SIZE and indicates the BEGINNING OF DATA. The BEGINNING OF DATA is an address, indicating the location where the first character of user data appears. The FILE SIZE indicates the length of the file.

This overhead data is needed by the apparatus which reads the file, in order to locate the beginning of the user data (based on the BEGINNING OF DATA), and the end of the user data (based on BEGINNING OF DATA+FILE SIZE).

Figure 3:
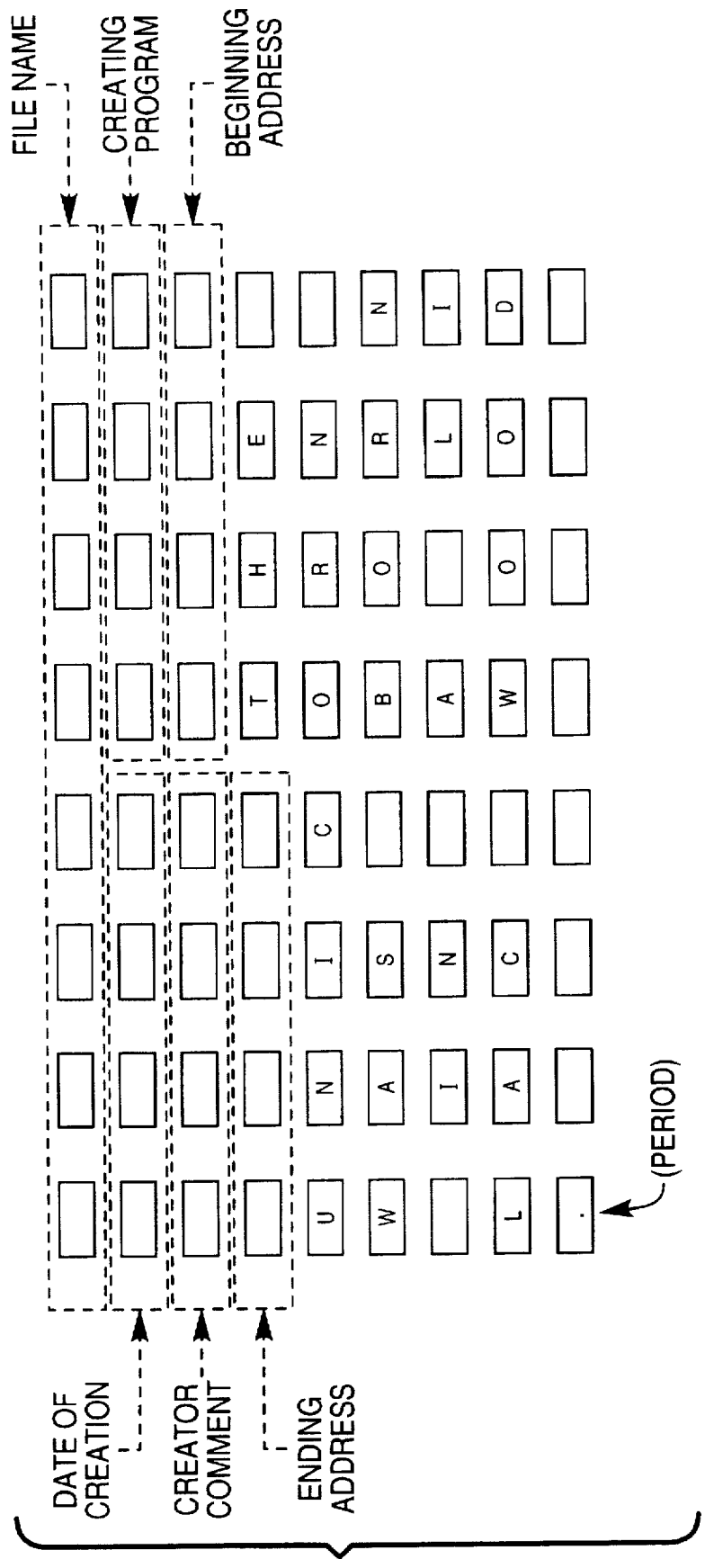
FIG. 3 illustrates a more complex file structure.

A more complex form of overhead data is illustrated in FIG. 3.

Additional overhead data includes (1) a name for the file, (2) the date of creation, and so on. The program generating the file uses this overhead data for various purposes.

Different programs and systems use different types of overhead data. One program cannot, in general, directly read another program's files, because of these differences.

Files Themselves Stored Differently

In addition, different systems store the data (which represents a file) differently. One type of difference can be illustrated by an analogy.

Assume a steel filing cabinet, in which one drawer holds 20 file folders, all of which are so full of paper that the drawer itself can hold nothing more. If a user withdraws a file folder, and adds 100 sheets to it, then the user cannot replace the folder into the drawer, because there is no room. The user now has at least two options.

One option is to return the entire file into another drawer, leaving an empty place in the first drawer. Another option is to return the original file, in its original condition, to the first drawer, and create a new file in a second drawer for the extra 100 pages.

Figure 4:
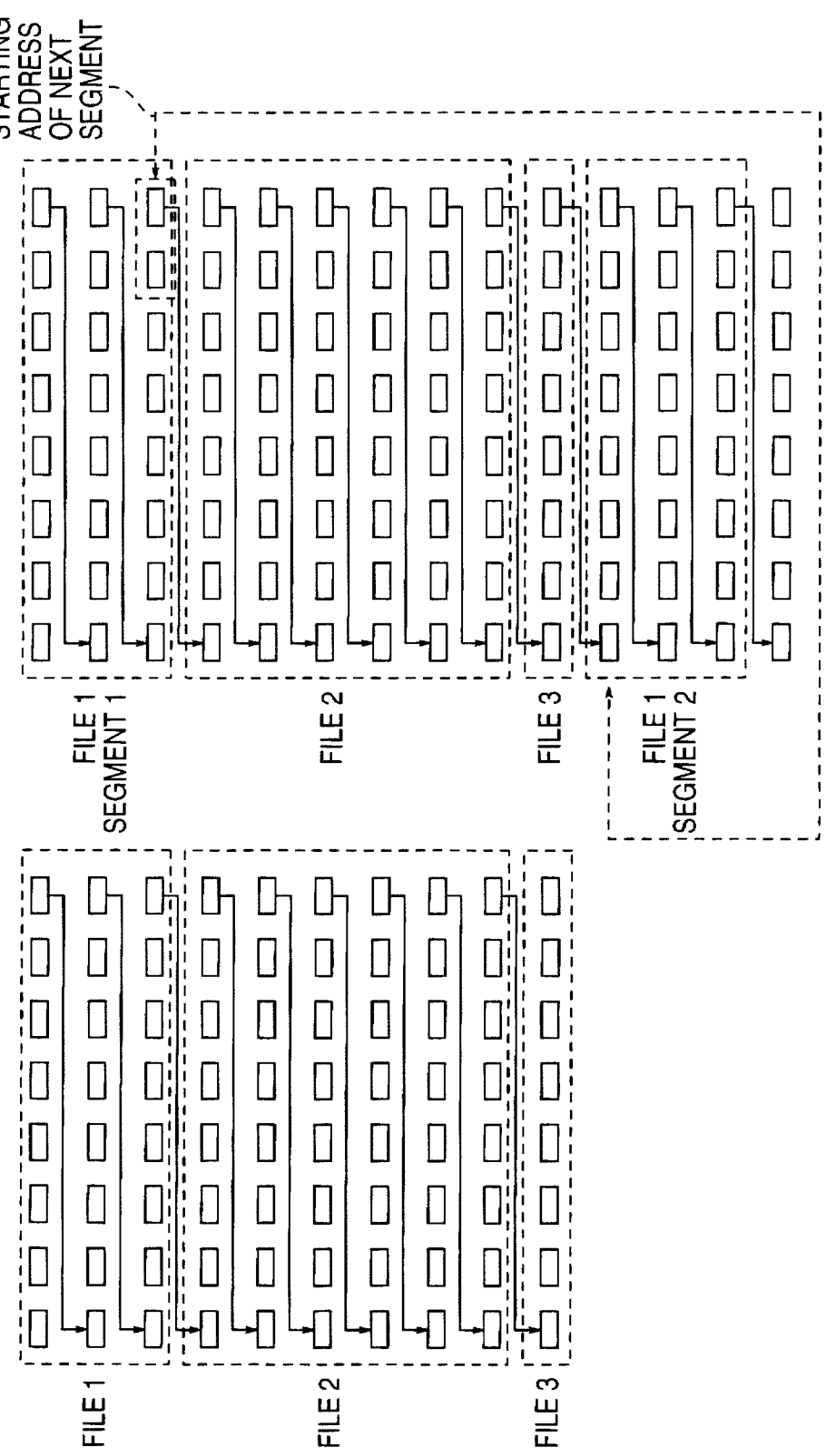
FIG. 4, which comprises

This analogy is applicable to computer file storage, as shown in FIG. 4. In FIG. 4A, three files are stored, FILE 1, FILE 2, and FILE 3. Assume that the user retrieves FILE 1, and increases its size. Now the user wishes to store this larger FILE 1.

One option is to replace the enlarged file at an empty location, such as following FILE 3 in FIG. 4A (analogous to placing the file folder into another drawer). However, this approach leaves the space previously occupied by FILE 1 empty. For various technical reasons, which need not be explained here, this empty space is difficult to use.

Another approach is to divide the new, larger FILE 1 into two parts, as indicated in FIG. 4B (analogous to dividing the file folder into two parts). This approach is called "fragmenting" One part is stored at the original location of FILE 1. The remainder is placed at a convenient place, such as following FILE 3. A pointer is placed at the end of the first part, telling where the remainder is located, as indicated. Apparatus which later retrieves the file uses the pointer to locate the fragments, and reconstruct the file.

Therefore, it is clear that different programs and systems (1) position user data in different ways within the files themselves, (2) use different types of overhead data, and (3) store the files themselves differently on storage media, by using approaches such as fragmenting. These differences explain, in part, why different programs may not be able to directly exchange their files. These differences, and others like them, can be termed "storage protocols."

Retrieving User Data

To retrieve user data from a file, it may be necessary to ascertain the storage protocol used. (The word "may" is used because knowing the storage protocol may not be strictly necessary. For example, assuming that the file can be successfully loaded into memory for analysis, straightforward data-processing techniques can sometimes isolate overhead data from user data. That is, in some word-processing files, overhead data is clearly identifiable, as containing nothing but printer information, font information, and other information which is relevant only to the processing of printed matter. In this example, the data-processing technique eliminated the need for the identity of the storage protocol. Further, some files may contain no overhead data.)

One approach to identifying the storage protocol is to initially examine a sample file of every type expected to be encountered. In the case of word-processing files, for example, one examines the files produced by every word-processing program of interest. Every word-processing program is expected to produce overhead data having a unique, recognizable pattern.

Examination Ascertains How User Data is Identified

This examination process will show that many files contain the identity of the program which created the file, such as the actual name of the program, within the overhead data.

The examination process also determines where the user data resides within each file. This can be done manually, by (a) generating a sample of text using a word-processing program, (b) storing the sample, and then (c) examining the actual bytes of the stored sample, and locating the sample text. It will be found that the sample text is marked by recognizable codes.

As a result, the examination process creates a table which lists, for each program, the manner of locating the user data within files created by that program. As a hypothetical example, the examination process may deduce that word-processing program XYZ stores user data between codes AAAA and ZZZZ.

Then, later, when user data is to be located in a file, the invention looks for the identity of the creating program within the overhead data of the file. When the identity is found, the invention uses the table to learn how to find the user data, and then extracts the user data. Now the user data has been isolated from the overhead data.

Program ID May be Absent

Not all files contain identity codes of the creating program. If no identity code is found, one derives an approach for locating user data, as known in the art. An extreme example is to retrieve the entire file, and present parts of it to the user, one after another. The user will examine each part, and indicate when user data begins.

In general, it is expected that files lacking identity codes will be rare. Even if they are not rare, the invention can be implemented with respect to files which contain identification of generating programs, and can ignore other files.

Some Parts of Storage Protocol Need not be Addressed

It will not always be necessary for the invention to deal with issues such as fragmenting, because these issues are addressed by the operating system of the computer storing the file. For example, without an operating system, the invention is required to deal directly with a disc drive controller, which controls the disc drive, which stores the file. In such a case, it is likely that the invention must take the following general steps:

1. Read the directory of the disc, to locate the address (eg, sector and track) where the file begins.
2. Determine the other sectors and tracks where the file fragments are located.
3. Order the controller to fetch the data fragments.
4. Reconstruct the file.

While this approach is not the simplest possible, it is fully tractable.

A simpler approach is to deal with an operating system, such as DOS, available from Microsoft Corporation, Redmond, Wash. It is expected that the vast majority of resources will be stored in systems using such a commonly available operating system.

With an operating system available, the invention need not deal directly with a drive controller. The invention simply issues the proper commands to the operating system, and the operating system returns the contents of the file as a stream of data. The operating system deals with issues such as fragmenting. The returned file does, in general, contain both overhead data and user data, which must, in general, be separated.

Under the invention, it is preferred that storage and retrieval be done using the same operating system as used by the application program which generated the data in question. In this way, differences in file format become the only significant differences which must be transformed, in order to allow different systems to use the data.

Transforming User Data into Compatible Format

After a user has ordered retrieval of a file, and the user data has been found within the file, it will probably be necessary to process the user data, to make it compatible with the program which the user is running. There are numerous approaches to such processing, because there are numerous possible differences between programs. A few examples are the following.

Formatting Codes

BOTH PROGRAMS ALLOW GIVEN CODES

Assume that the user data was generated by a word-processing program, which is herein called the "generating program," to distinguish it from the "user's program," which is retrieving the file. Generating programs allow "formatting codes" to be inserted around words and phrases, to tell peripheral devices, such as printers and displays, how to display the phrases.

Figure 5:
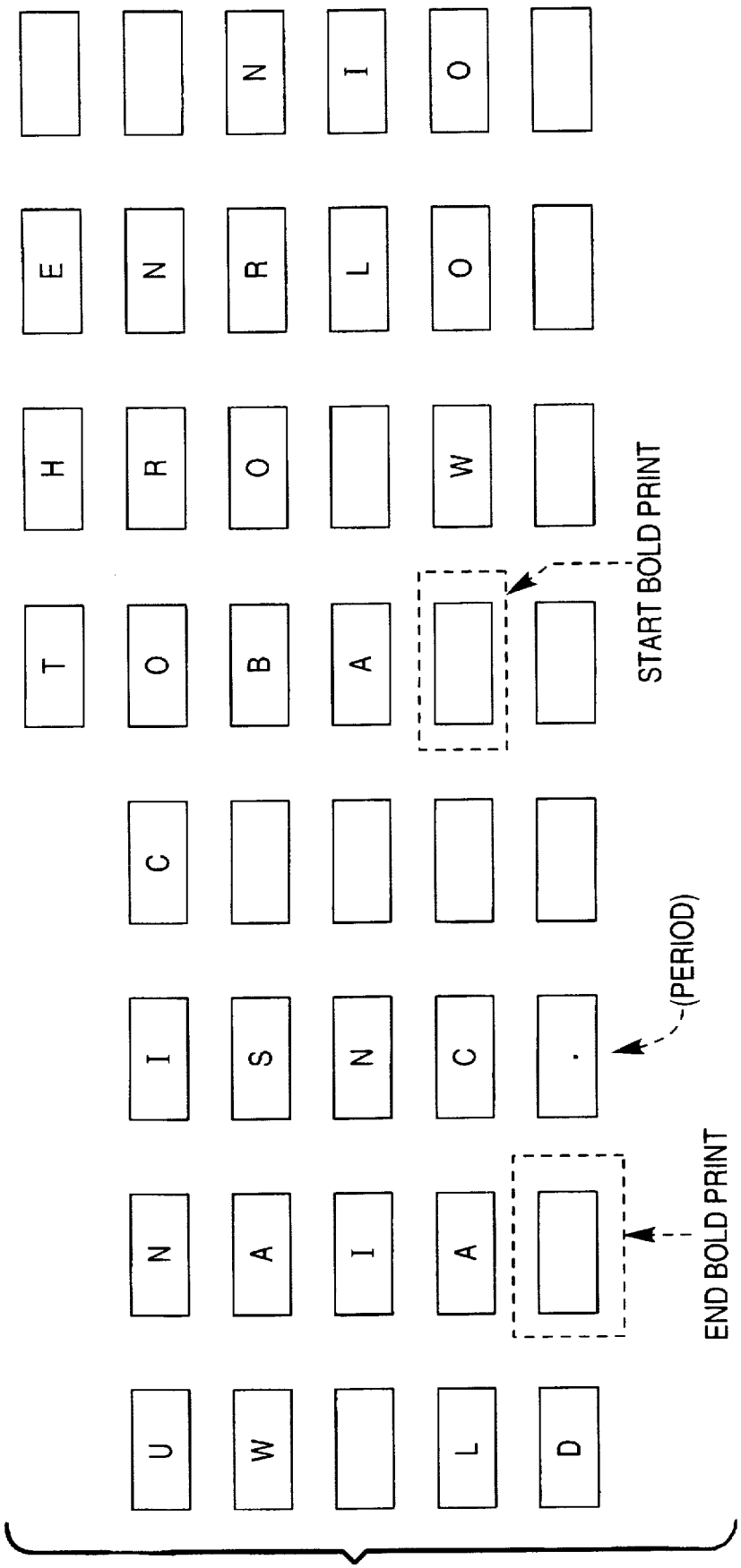
FIG. 5 illustrates formatting codes.

For example, FIG. 5 illustrates two codes, which indicate that the word "wood" should be printed and displayed as "bold" text (meaning that the lines used to draw the word should be thicker than lines used for adjacent words).

If both programs (ie, the generating program and the user's program) accommodate "bold" codes, then no problem arises, except for possibly translating the original formatting codes into codes understandable by the user's program. That is, for example, the original program may use three bytes (such as C3, 0C, C3 (HEX)) to indicate beginning of a bold passage, and three other bytes (such as C4, 0C, C4 (HEX)) to indicate the end of a bold passage.

The user's program may use different bytes. Thus, translation may be necessary between the two byte sets for the two programs. To accomplish the translation, one simply obtains a list of the codes used in each program, and generates a look-up table for translating from one to the other.

ONE PROGRAM USES CODE, ONE DOES NOT

A more complex situation arises when a code is used in one program, but there is no corresponding code in the other program. For example, the generating program may allow codes for different types of fonts (eg. Courier, Times) within a document; the user's program may not. In such a case, there are several options. For example, the code may be deleted; a note may be added at the proper location indicating that such a code was found, but a corresponding code is not available in the user's program; or other actions may be taken.

Translation is Straightforward

The invention, in general, is not concerned with the details of translating the codes from one document to another. The details of translation are matters of design choice, and can be accomplished as a routine matter of computer programming. Rather, the invention specifies that the translation be done, and preferably in a manner which is invisible to the user.

If, for some reason, translation is too burdensome, because of gross incompatibilities between the user's program and the originating program, then a default translation can be used. In the default translation, formatting codes are eliminated, and the bare text data is presented to the user, without formatting codes.

Therefore, when a user seeks to retrieve a resource, the invention a) identifies the program into which the user wishes to load the resource, b) ascertains whether the resource is compatible, and, if not, c) locates the user data within the resource, and d) translates the user data into a form compatible with the program.

Language Translation

This section will discuss (a) how to identify the natural language in which a file is written, and (b) translation of the language into one preferred by the user.

File Identifies Its Language

It is expected that the overhead data of the file will identify the natural language (eg., English or French) in which the user data was written. Thus, the invention merely need locate this identity information, and select a translation program. However, it is possible that some files will not contain such identity information. In this case, the invention is required to identify the language.

Identifying Language: One Approach

One approach is to assume that the language is one of a specified group, such as English, French, Spanish, Italian, Portuguese, Russian, Japanese, and Hindi. In principle, there is no limit to the size of the group.

CREATE 100-WORD LIST FOR EACH LANGUAGE

Initially, master lists, of 100 words each, are established which contain words unique to each language. For example, the word "nicht" is believed to occur uniquely in German, and in none of the other languages of the group. Similarly, "vous" is believed to occur uniquely in French. To the contrary, the word "in" occurs in several different languages.

To generate the master lists, one may start with a newspaper written in one of the languages, such as an English version of the New York Times. Next, one identifies the two hundred most frequently used words in the newspaper, by simple counting. (The number of words identified, 200, is larger than the number which the master list is to contain, 100, because some of the words identified may not reach the 10 master list, because of occurring in two languages.) Then, one inquires whether each identified word exists in a dictionary of the other languages. That is, assume that "street" is an identified word. One inquires whether that identical word ("street") occurs in the dictionary of each other language. (A distinction should be made here: one does not inquire whether an equivalent word exists in each other language. That is, the fact that "Strasse" in German corresponds to "street" is not relevant. One simply inquires whether "street" exists in the German dictionary.)

When an identified word is found to exist in no dictionary (other than that of the newspaper from which it was taken, which would be an English dictionary in this example), that word is added to the master list of one hundred unique English words. When the master list reaches one hundred words, one then selects a newspaper in another language, and generates a master list of unique words for the other language, in the same way.

This procedure generates a master list of one hundred unique words for each language. Other procedures can produce the master lists.

When the language of a file is to be identified, the invention searches the file, word-by-word. In the example of FIG. 2, the invention locates the first word in the file (which is "The") and then searches each 100-word master list for that word. It will be found in the English list. The invention tentatively identifies the language as English.

The invention then locates the next word, which is "unicorn" This word probably did not gain entry into a 100-word master list, because it was probably not identified as a commonly used word in a newspaper. In such a case, the invention proceeds to the next word, and so on.

When a suitable number, such as twenty, words in the file have been found in a single 100-word list, the language is considered as identified. (English will be concluded in this example.) A proper translation program is then selected.

Alternate Language Identification

It is possible to use a human expert, such as a linguist, to identify the language of the file. In such a case, when a file is retrieved, the invention signals the expert that a language needs to be identified, and transmits a sample of the file to the expert, who identifies the language. (As the Related Applications indicate, the expert can be located anywhere in the world, with respect to the file. The CLS, discussed below, handles the details of file transmission to the expert.)

The use of an expert is expected in two primary situations.

USE EXPERT DIRECTLY

One will occur when the user data consists of very strange language. For example, a given piece of user data may be replete with jargon, which contains few words contained in the lists of 100 unique words.

EXPERT IDENTIFIES UNIQUE PATTERNS IN EACH LANGUAGE

PATTERNS ARE LATER USED TO IDENTIFY LANGUAGE IN WHICH THEY ARE FOUND

A second is identification of language in a different manner than described above, as by using an expert in combination with artificial intelligence techniques.

In a very simple sense, the expert identifies the language of a sample of words, by reading the sample. Then, the invention analyzes samples of each language, in order to find unique character- and word patterns (or other patterns).

Now the invention can associate unique patterns with each language. The invention stores the unique patterns, together with the corresponding language identities, in a reference table. Later, to identify a language, the invention looks for the unique patterns within a sample of the language, such as in a file whose language is to be identified. When a pattern is found, the invention identifies the language containing it, based on the table.

For example, neural network techniques, character-recognition techniques, or speech-recognition techniques can be used to analyze a given piece of language, in order to find unique attributes. (These attributes are not necessarily those which would be identified by a human expert in identifying the language. Rather, these attributes will more likely consist of subtle, and possibly lengthy, character patterns, or word patterns.) The expert identifies each language containing the attributes, and the program thus develops a correlation between the attributes it discovered and the language identity.

As an extremely simple example of this principle, in English, "Q" is always followed by "U". Thus, if a given piece of text contains a "Q" but no following "U", this is evidence in favor of eliminating English as the language. As another example, the umlaut ("") exists in German, but not in English. When an umlaut is found, the language is probably not English, and is perhaps German.

Translation

After identification of the language of the user data, the invention translates the file from this language to the language specified in the user's profile. Language translation programs are commercially available, such as the Power Translator package available from Globalink.

User Preferences

As stated above, the user profile contains information identifying the preferences of the user. Some of these preferences are the following.

Input Device. Some users prefer to use keyboards. Others prefer pointing devices, such as mouses and digitizing tablets. The user profile indicates each user's preference.

A more advanced input device involves speech recognition. If the user prefers this, the profile so indicates. The invention actuates the necessary programs and hardware which allows the user to interact with the system by speaking.

Speech recognition equipment is commercially available. One supplier is Creative Labs, which manufactures the product known as Voice Assist.

The invention causes all necessary programs and devices to be actuated as required, based on the preferences contained in the profile.

Output Devices. Some users prefer to use cathode ray tube displays. Others may prefer flat-panel displays. Yet others may prefer large-screen projection systems.

Holographic projection systems exist presently, but are expensive. However, in the future, it is expected that their cost will reduce to a level which allows widespread use.

The user profile indicates the preferred display, and actuates it accordingly.

The user profile will also contain information as to the format of the visual display. For example, a preferred background color will be specified, as well as a preferred information color. One possible pair of colors can be white print (for information) upon a blue background. Colors of additional fields on the screen can also be specified.

A present example of such format specification is found in the Graphical User Interface sold under the trade name "Windows," and available from Microsoft Corporation, Redmond, Wash. Numerous aspects of the visual appearance of the display which "Windows" generates can be controlled by the user. The operations manual explains how to select options, to modify the appearance. The user's options are stored in one or more files, and used when the interface is called into action.

Speech synthesis packages examine a text file, convert the words into spoken speech, and "speak" the words to the user. If a user prefers speech synthesis, the user profile so specifies. The profile can also specify various aspects of the speech itself, such as male or female voice, voice loudness, voice pitch, and so on.

Speech synthesis packages are commercially available. One supplier is Creative Labs, which manufactures the product known as Sound Blaster.

Compression

During transfer of a resource from its repository to the site of the user, it may be compressed to reduce its size. If so, it will then be decompressed upon arrival at the user's site. The invention handles this process, without intervention of the user.

Compression and expansion software is commercially available. An example is the shareware product called PK ZIP.

Recapitulation

Therefore, to recapitulate in non-exhaustive fashion, the invention does the following:

1. It operates in conjunction with apparatus available from AT & T Global Information Solutions Company, Dayton, Ohio, called the "Continuous Learning System," CLS. This system stores resources, such as computer files, at multiple different computer sites. The Related Applications discuss aspects of CLS.

These files are, in general, created by multiple different computer programs, running on different systems. In general, a given file cannot be loaded by an arbitrarily selected program. Processing must be done to assure compatibility. The invention provides compatibility.

2. The invention allows a user to retrieve any file, to which the user is allowed access, no matter where the file is located.

3. When a user orders retrieval of a file, the invention inquires whether the file is compatible with the program the user is running. (The CLS itself provides capability of displaying file contents. However, in the general case, it is expected that the user will run a program of the user's choice, in order to deal with the information contained within the file.)

One approach to ascertaining compatibility is to search the header of the file, to find the name of the program which generated the file.

4. If compatibility is found, the file is retrieved, and loaded into the user's program. Alternately, CLS has an automatic launching feature, which the user's profile may indicate should be used. In automatic launching, when CLS retrieves a resource, such as a file, it examines the file for the identity of the generating program. When it finds the identity, it then inquires whether the generating program is available to the user. If so, CLS then automatically finds the generating program, such as a word-processing program, launches it, and loads the file.

The user, in the user's profile, may specify that this option should be taken, if possible. If not, then the invention performs translation of the file, into a format compatible with the user's program.

5. If the file is a human-language file (as opposed to a computer language, such as "C"), the invention identifies the language (eg. English) and launches a language-translation program which translates it into another language, if specified by the user's profile.

6. The file is then presented to the user, using an interface which matches the specifications contained in the user's profile. The specifications include matters such as input device, output device, preferred colors, and so on.

Additional Considerations

1. The user profile, discussed herein, is preferably generated as a "Profile" as that term is defined in the Related Applications.

2. It is possible that a resource can be found which cannot be made compatible with a user's program. An encrypted resource, or a resource having an unfamiliar storage protocol, provide two examples. This fact does not defeat the effectiveness of the invention. It is not necessarily required that the invention be able to deal with every conceivable resource in existence.

3. It is to be emphasized that the transformation process is invisible to the user. That is, for example, the procedure of identifying language, and calling a translation program, is established by the designer of the system, and does not involve the user. The invention identifies the language and calls the translation program. This invisibility applies to other aspects of the invention, discussed above.

4. In identifying the language of a file, it is possible that some words may be found which are contained in a master list of one language, and yet other words may be found which are contained in a master list of a second language. In such a situation, the identification of the language becomes a probabalistic procedure, which can be handled in known ways.

Further, in such a case, resort to a secondary procedure may be taken. For example, assume that the initial, "master-list" approach narrows the possible number of languages to two. Then, the secondary procedure, such as one based on neural networks, described above, is taken to identify the correct language.

5. "Natural language" does not apply, of course, to all files. Numerical data does not have a natural language. Nor does a computer program written in source code. Nor does a file representing a vector-mapped image, or a bit-mapped image.

Figure 6:
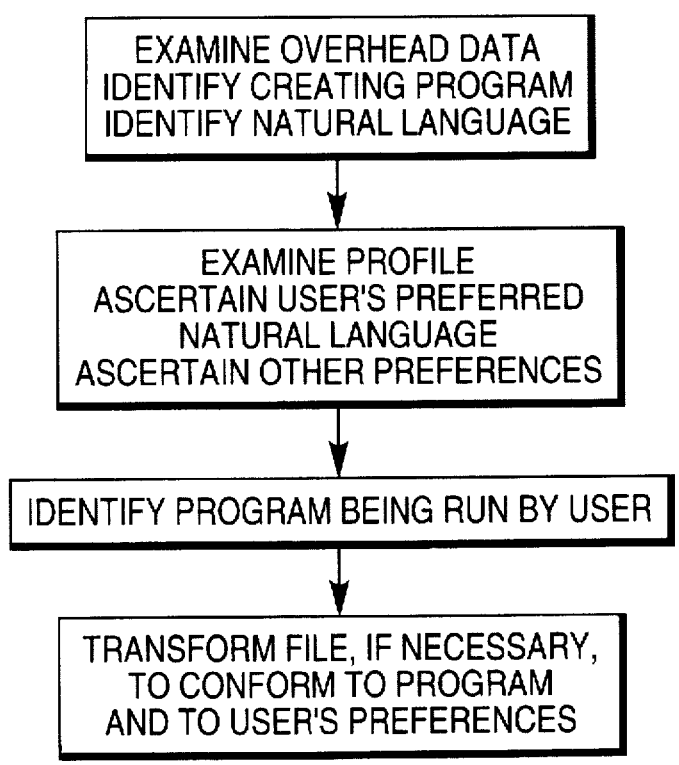
FIG. 6 illustrates a flow chart for one form of the invention.

6. FIG. 6 illustrates a high-level view of operation of one form of the invention. When a user orders retrieval of a file, the invention examines the overhead data, in order to identify the program which created the file, as indicated in the uppermost block. Also, the invention identifies the natural language of the file, and other features, such as type of compression, and so on. (Other matters are not indicated.)

Also, the invention examines the user's profile, in order to ascertain the user's preferences and the user's preferred natural language, as indicated by the second block.

The invention identifies the program being run by the user, such as a specific word-processing program.

Then, as indicated by the lowermost block, the invention transforms and translates the file, in order to conform to the preferences and preferred language. Of course, transformation may not be necessary, if conformity already exists.

Definitional Matters

"IAF" is an acronym for Information Access Facility, which is a facility having the following minimum capabilities:

a) ability to store resources at multiple, distributed locations;

b) ability of allowing a user, who is remote from the distributed locations (except possibly one location, where the user can, but need not, be located), to view a list of resources available to the user; and c) ability to retrieve resources identified by the user, and deliver the retrieved resource to the user's computer.

d) As an option, the IAF may store Learning Profiles, as that term is defined in the Related Applications. In general, the Learning Profile contains information regarding the user's (a) learning requirements, such as the curriculum (eg., college chemistry) undertaken by the user;

(b) learning history, which represents the user's current status in the curriculum, such as first-semester college junior; and (c) personal learning characteristics, which includes the user's preferred styles of learning and possible disabilities.

A system having these characteristics can be called a system having IAF characteristics. The CLS, described in the Related Applications, has IAF characteristics.

The user profile specifies preferences of a user. It may not be possible, in all cases, to cause a resource selected by a user to become compatible with all specified preferences. However, insofar as the resource is transformed so that more preferences are matched than previously, the invention can be said to "enhance" the compatibility between the resource and the preferences.

Numerous substitutions and modifications can be undertaken without departing from the true spirit and scope of the invention. What is desired to secure by Letters Patent is the invention as defined in the following claims.

I claim:
1. An information retrieval system, comprising:
 a) a system having IAF characteristics, which allows a user to select a remote resource;
 b) means for allowing a user to run a selected computer program; and
 c) transformation means for causing the selected remote resource to become compatible with the selected program, the transformation means including means for:
  i) identifying the program into which the user wishes to load the resource,
  ii) ascertaining whether the resource is compatible, and, if not,
  iii) locating user data within the resource, and
  iv) translating the user data into a form compatible with the program.

2. An information retrieval system, comprising:
 a) a system having IAF characteristics, which allows a user to select a remote resource;
 b) means for ascertaining a preferred natural language of the user; and
 c) translation means for translating the selected remote resource into the preferred natural language, without further intervention by the user.

3. An information retrieval system, comprising:
 a) an IAF-system having IAF characteristics;
 b) means for allowing a user to run a selected computer program; and
 c) translation means for
  i) allowing a user to select a resource from the IAF-system;
  ii) causing the selected resource to become compatible with the selected program, if required;
  iii) identifies the program into which the user wishes to load the resource,
  iv) ascertains whether the resource is compatible, and, if not,
  v) locates user data within the resource, and
  vi) translates the user data into a form compatible with the program.

4. A system according to claim 3, in which the translation means comprises:
 vii means for identifying a natural language.

5. An information retrieval system, comprising:
 a) a IAF-system having IAF characteristics;
 b) means for storing a user profile which indicates preferences of a user regarding one or more of the following:
  i) preferred natural language;
  ii) preferred input device parameters;
  iii) preferred output device parameters;
 c) translation means for
  i) allowing a user to select a resource from the IAF-system; and
  ii) enhancing compatibility between the selected resource and the preferences.

6. An information retrieval system, comprising:
 a) a system having IAF characteristics, which allows a user to retrieve a remote resource;
 b) means for storing a profile which indicates user preferences on matters of
  i) preferred natural language; and
  ii) user interface characteristics;

c) means for
   i) identifying a program which is compatible with the remote resource,
   ii) launching the identified program, if possible, and
   iii) loading the remote resource into the launched program; and
d) means for
   i) identifying an alternate program which is compatible with the remote resource, and
   ii) transforming the remote resource, in order to enhance compatibility with the alternate program.

7. In the use of a computer program to translate a file from one natural language to another, the improvement comprising the following steps:
   a) running a program which identifies the natural language of the file; and
   b) based on the natural language identified, selecting a translation program.

8. In the use of a computer program to translate a file from one language to another, the improvement comprising the following steps:
   a) storing a profile which identifies a preferred human readable language of a user;
   b) running a program which identifies the human readable language of the file; and
   c) based on the human readable language identified, selecting a translation program, which translates
      i) from the identified human readable language
      ii) into the preferred human readable language.

9. A method of identifying a natural language of a file which contains natural words, using a computer, comprising the following steps:
   a) for each of several natural languages, storing a list of natural words unique to the respective language;
   b) selecting a natural word from the file, and identifying a list containing the natural word;
   c) repeating step (b) at least once; and
   d) identifying the list containing the largest number of selected natural words.

10. In the use of a computer for retrieving a computer file into a computer program, the improvement comprising:
    a) storing a profile for a user, which indicates the user's preferred modes of interaction with a computer through input devices and output devices;
    b) operating a system which does the following upon retrieval:
       i) examines the file and ascertains the identity of the program which generated the file;
       ii) examines the profile;
       iii) ascertains the identity of said program; and
       iv) modifies the file, if necessary, to conform to the profile and said program.

11. The improvement according to claim 10, in which the profile contains an indication of a user's preferred natural language.

12. In the use of a computer, the improvement comprising:
    a) storing information which indicates a user's preferred natural language;
    b) maintaining a system which does the following when the user orders retrieval of a file:
       i) identifies the natural language, if any, of the file; and
       ii) causes a program to translate the file into the user's preferred natural language.

* * * * *